United States Patent
Fujita

(10) Patent No.: US 7,928,676 B2
(45) Date of Patent: Apr. 19, 2011

(54) VEHICLE MOTOR CONTROL APPARATUS

(75) Inventor: Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 356 days.

(21) Appl. No.: 12/247,254

(22) Filed: Oct. 8, 2008

(65) Prior Publication Data

US 2009/0322270 A1  Dec. 31, 2009

(30) Foreign Application Priority Data

Jun. 25, 2008  (JP) .................................. 2008-165584

(51) Int. Cl.
    *H02P 6/14*  (2006.01)
(52) U.S. Cl. .................................. 318/400.26; 318/599
(58) Field of Classification Search .................. 318/798, 318/800, 801, 811, 599, 400.26, 400.27
    See application file for complete search history.

(56) References Cited

U.S. PATENT DOCUMENTS

| 4,173,732 A | * | 11/1979 | Anderson ..................... 318/375 |
| 5,015,903 A | * | 5/1991 | Hancock et al. .............. 310/168 |
| 5,652,493 A | * | 7/1997 | Hendershot, Jr. ............. 318/701 |
| 7,180,216 B2 | * | 2/2007 | Hirzel et al. .................. 310/168 |

FOREIGN PATENT DOCUMENTS

| JP | 63-314195 A | 12/1988 |
| JP | 06-276778 A | 9/1994 |
| JP | 2003-209988 A | 7/2003 |
| JP | 2004-129379 A | 4/2004 |

* cited by examiner

Primary Examiner — Rina I Duda
(74) Attorney, Agent, or Firm — Sughrue Mion, PLLC

(57) ABSTRACT

There is provided a vehicle motor control apparatus that alternately switches a first ON state in which one of the stator winding terminals is energized through an upper switch element group and another stator winding terminal is energized through a lower switch element group and a second ON state in which one of the stator winding terminals is energized through one of the upper switch element group and the lower switch element group and two other stator winding terminals are energized through the other switch element group, in one cycle period of an electric angle that changes as the rotor rotates.

6 Claims, 7 Drawing Sheets

180-DEGREE RECTANGULAR WAVE

120-DEGREE RECTANGULAR WAVE

MAXIMUM TORQUE (MINIMUM TORQUE RIPPLE)

VEHICLE MOTOR CONTROL APPARATUS

BACKGROUND OF THE INVENTION

1. Field of the Invention

The present invention relates to a vehicle motor control apparatus for controlling the drive of a motor that is mounted on a vehicle and coupled with the engine, and more particularly to a vehicle motor control apparatus capable of raising the average torque so as to activate an engine rapidly and smoothly when the engine is restarted.

2. Description of the Related Art

Japanese Patent Laid-Open Pub. No. 2004-129379 discloses a conventional control apparatus for controlling the drive of a vehicle motor that is coupled with an engine. The control apparatus disclosed in Japanese Patent Laid-Open Pub. No. 2004-129379 utilizes a control method in which, when an engine is started, a method of energizing the respective phase of stator windings of the motor is switched from a 120-degree rectangular wave energization method to a 180-degree rectangular wave energization method.

In the motor control apparatus disclosed in Japanese Patent Laid-Open Pub. No. 2004-129379, the currents in the respective phase of stator windings of the motor flow in a current waveform decided by the 120-degree rectangular wave energization method or the 180-degree rectangular wave energization method; therefore, the output value of the motor can be nothing but the value decided by any one of the foregoing energization methods. Moreover, for the above reason, there has been a problem that the low-speed rotation (the 120-degree rectangular wave energization method) makes the current waveform rectangular and causes the torque ripple to increase.

SUMMARY OF THE INVENTION

The present invention has been implemented in order to solve the foregoing problems; the objective thereof is to provide a vehicle motor control apparatus capable of enhancing the average output torque of a motor and reducing the torque ripple so as to rapidly and smoothly raise the rotation speed of an engine up to a high speed when the engine is restarted.

Another objective thereof is to provide a vehicle motor control apparatus that can reduce harmonic components of electric currents that flow in the stator windings of a motor so as to decrease electromagnetic exciting force that causes an electromagnetic noise sound and electromagnetic noise, thereby reducing the noise sound of the motor, which is caused by the electromagnetic exciting force.

A vehicle motor control apparatus according to the present invention is provided with an electric-power conversion unit in which a plurality of drive arms each provided with an upper switch element and a lower switch element that are connected in series with each other is connected between the positive and negative terminals of a DC power supply unit, and the respective intermediate connection points of the upper switch elements and the lower switch elements of the drive arms are connected with corresponding terminals for respective phases of the stator windings of a motor and a control means that on/off-controls the upper switch elements and the lower switch elements, thereby applying voltages to and energizing the stator windings of the motor so as to drive and control the motor. The vehicle motor control apparatus is configured in such a way that the control means causes a first ON state in which, through the upper switch element group in the drive arms, one of the stator winding terminals is energized, and through the lower switch element group in the drive arms, another stator winding terminal is energized and a second ON state in which, through the upper switch element group in the drive arms, one or two of the stator winding terminals are energized, and through the lower switch element group in the drive arms, all other stator winding terminals (two terminals or one terminal), which are not energized by the upper switch element group, are energized, and controls the electric-power conversion unit in such a way that the first and second ON states are alternately switched in one cycle period of an electric angle that changes as the rotor of the motor rotates.

In a vehicle motor control apparatus according to the present invention, the q-axis current, out of the currents that flow the stator windings of a motor, which has a large influence on the occurrence of torque, becomes large, whereby the average output torque of the motor can be enhanced. Moreover, because the current waveform becomes similar to a sinusoidal wave, fluctuation in the q-axis current decreases; therefore, the torque ripple can be reduced. As a result, it is made possible to raise the rotation speed of an engine up to a high speed when the engine is restarted, whereby the engine can rapidly and smoothly be restarted.

Still moreover, because the current waveform becomes similar to a sinusoidal wave and harmonic components decrease, electromagnetic exciting force that causes an electromagnetic noise sound and electromagnetic noise can be reduced; therefore, the noise sound of the motor, caused by electromagnetic exciting force, can be reduced.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
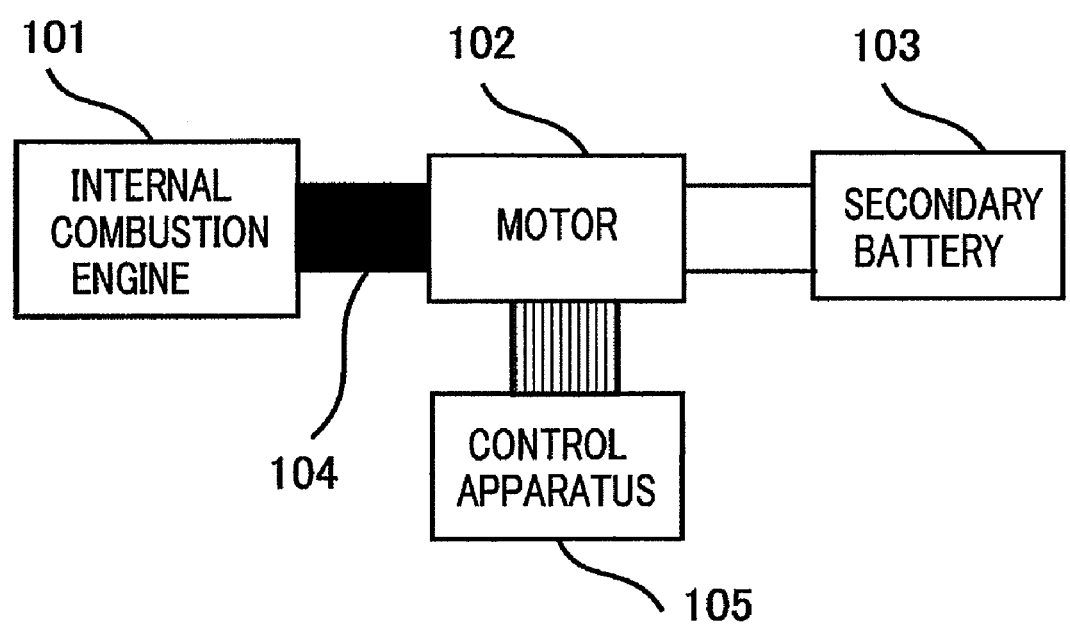
FIG. 1 is a conceptual configuration diagram for a vehicle motor control apparatus according to Embodiment 1 of the present invention.

FIG. 1 is a conceptual configuration diagram in the case where a vehicle motor control apparatus or a power-generation motor control apparatus according to Embodiment 1 of the present invention is applied to a vehicle. In FIG. 1, reference numeral 101 denotes an internal combustion engine such as a gasoline engine or a diesel engine; reference numeral 102 denotes a motor that is coupled with the internal combustion engine 101 directly or via a coupling means 104 such as a belt or a pulley and disposed in such a way as to be able to transfer torque to and receive torque from the internal combustion engine 101; reference numeral 103 denotes a secondary battery that is electrically connected to the motor 102; the secondary battery 103 may be a secondary battery that is utilized also for other vehicle loads or a secondary battery dedicated to the motor 102. The secondary battery 103 may be a capacitor, and the motor 102 may be a power-generation motor. Reference numeral 105 is a control unit for driving and controlling the motor 102.

Figure 2:
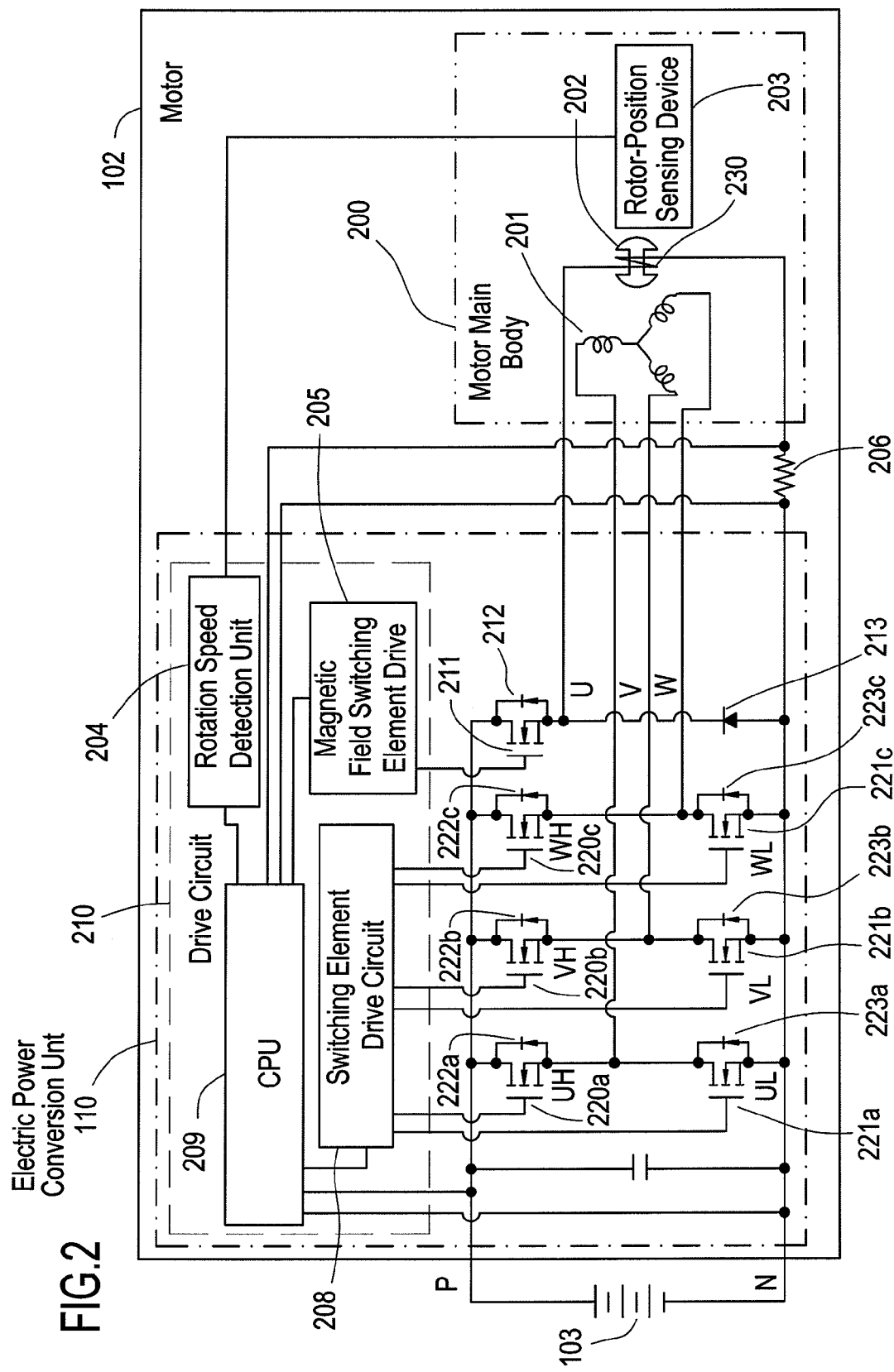
FIG. 2 is an electric circuit diagram of a vehicle motor control apparatus according to Embodiment 1 of the present invention.

Next, FIG. 2 is an electric circuit diagram for the motor 102 integrated with the control unit 105. In FIG. 2, the motor 102 is configured with stator windings 201 that are three-phase and Wye-connected or three-phase and delta-connected, a so-called motor main body 200 formed of a magnetic-field winding 202, and an electric-power conversion unit 110 having a control function. A rotor 230 is magnetized by means of the magnetic-field winding 202; however, the rotor 230 may be magnetized by means of a magnetic-field winding and a permanent magnet or magnetized only by a permanent magnet. Reference numeral 203 is a rotor-position sensing device that detects angular position information on the rotor 230 and formed, for example, of a rotation sensor such as a resolver or a hall IC switch. Reference numeral 204 is a rotation speed detection unit that detects the rotation speed of the motor, based on the information from the rotor-position sensing device 203.

The electric-power conversion unit 110, which is a so-called three-phase inverter utilizing transistors as switch elements, is configured with six electric-power-conversion switching elements 220a to 220c (referred to also as upper switch elements) and 221a to 221c (referred to also as lower switch elements) connected to respective terminals that are connected with the stator windings 201 of the motor main body 200, a drive circuit 210 as a control means that drives these switching elements, diodes 222a to 222c and 223a to 223c that perform rectification operation when electric power is generated and current reflux operation when the power-generation motor is utilized as a motor and the switching elements are turned off, a magnetic-field-winding current switching element 211 connected to the magnetic-field winding 202 of the motor main body 200, and a flywheel diode 213.

The drive circuit 210 in the electric-power conversion unit 110 is configured with a CPU (calculation device) 209; a switching element drive circuit 208 that transmits commands to electric-power-conversion switching elements 220a to 220c and 221a to 221c, based on on/off commands, inputted from the CPU (calculation device) 209, for voltages applied to the stator windings 201 for the respective phases and the magnetic-field winding 202; and a magnetic-field switching element drive circuit 205 that transmits a command to the magnetic-field-winding current switching element 211. The drive circuit 210 performs control in such a way that torque is produced in the motor main body 200. In the case where the motor main body 200 is a power-generation motor, the drive circuit 210 functions as a power-generation control circuit so as to perform power-generation control, so that the power-generation motor functions not only as a motor but also as an electric power generator that generates electric power.

Figure 3:
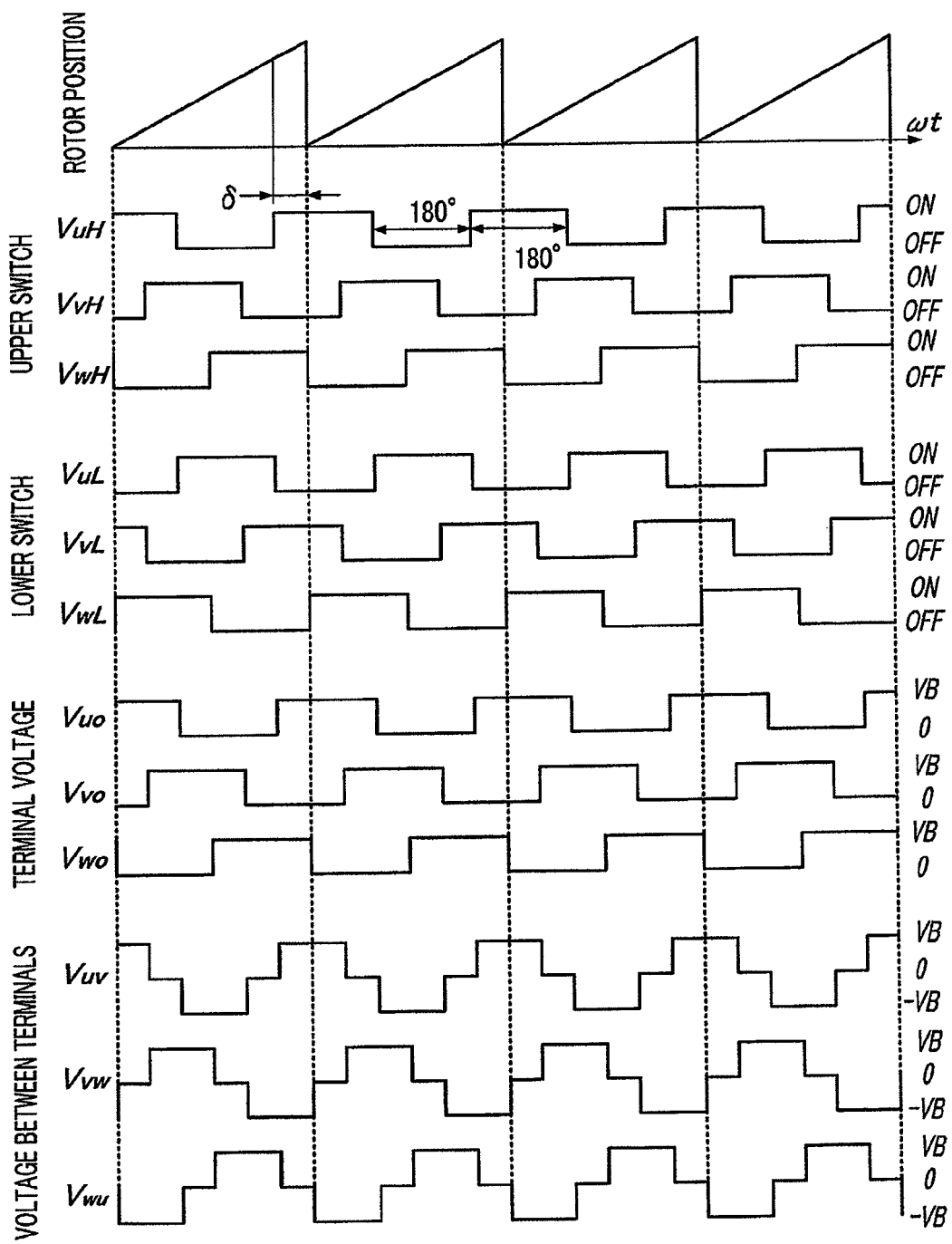
FIG. 3 is a chart representing respective examples of a rotor position, three-phase terminal voltages, and voltages between three-phase terminals in the case where energization is made in accordance with a conventional 180-degree rectangular wave energization method.
Figure 4:
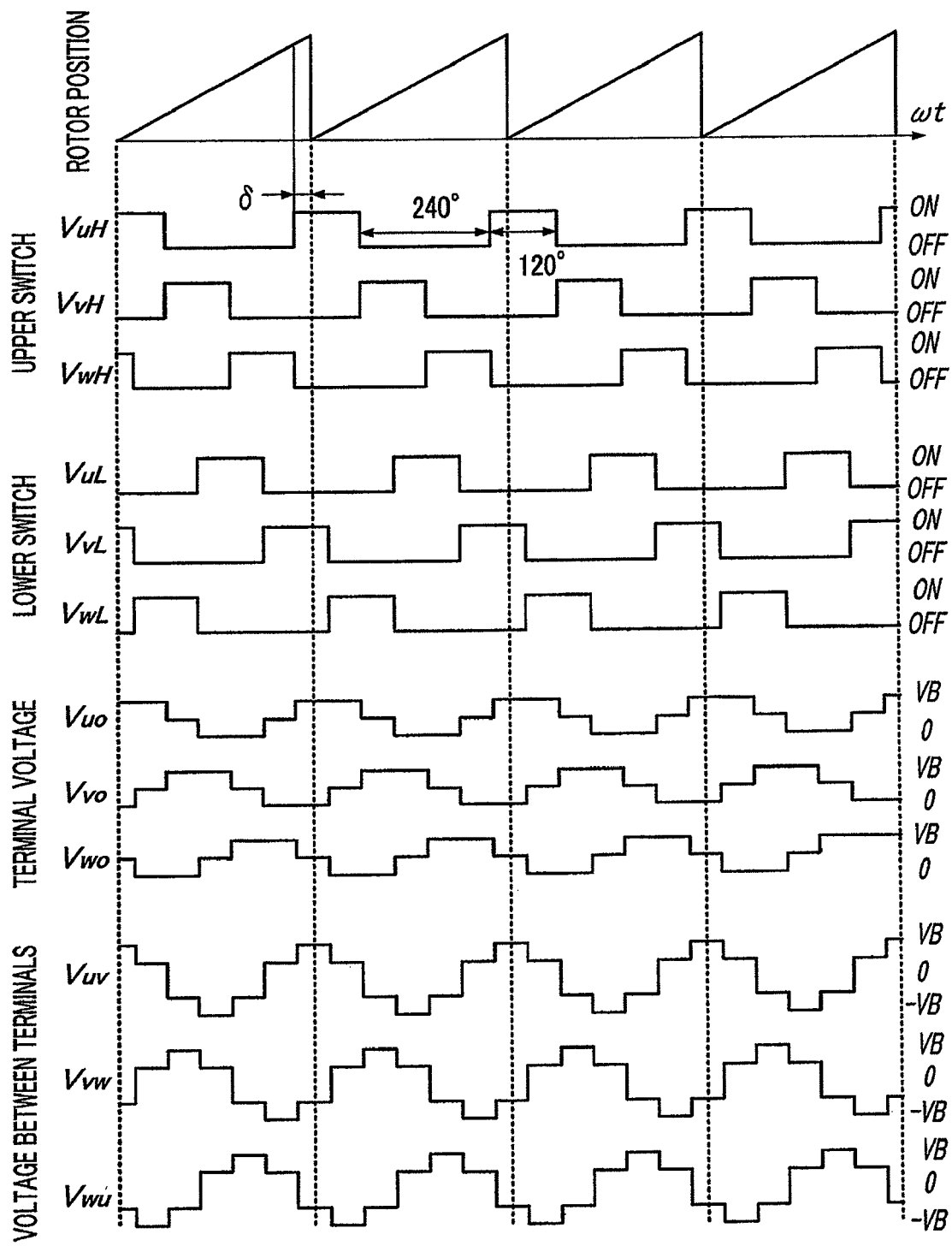
FIG. 4 is a chart representing respective examples of a rotor position, three-phase terminal voltages, and voltages between three-phase terminals in the case where energization is made in accordance with a conventional 120-degree rectangular wave energization method.
Figure 5:
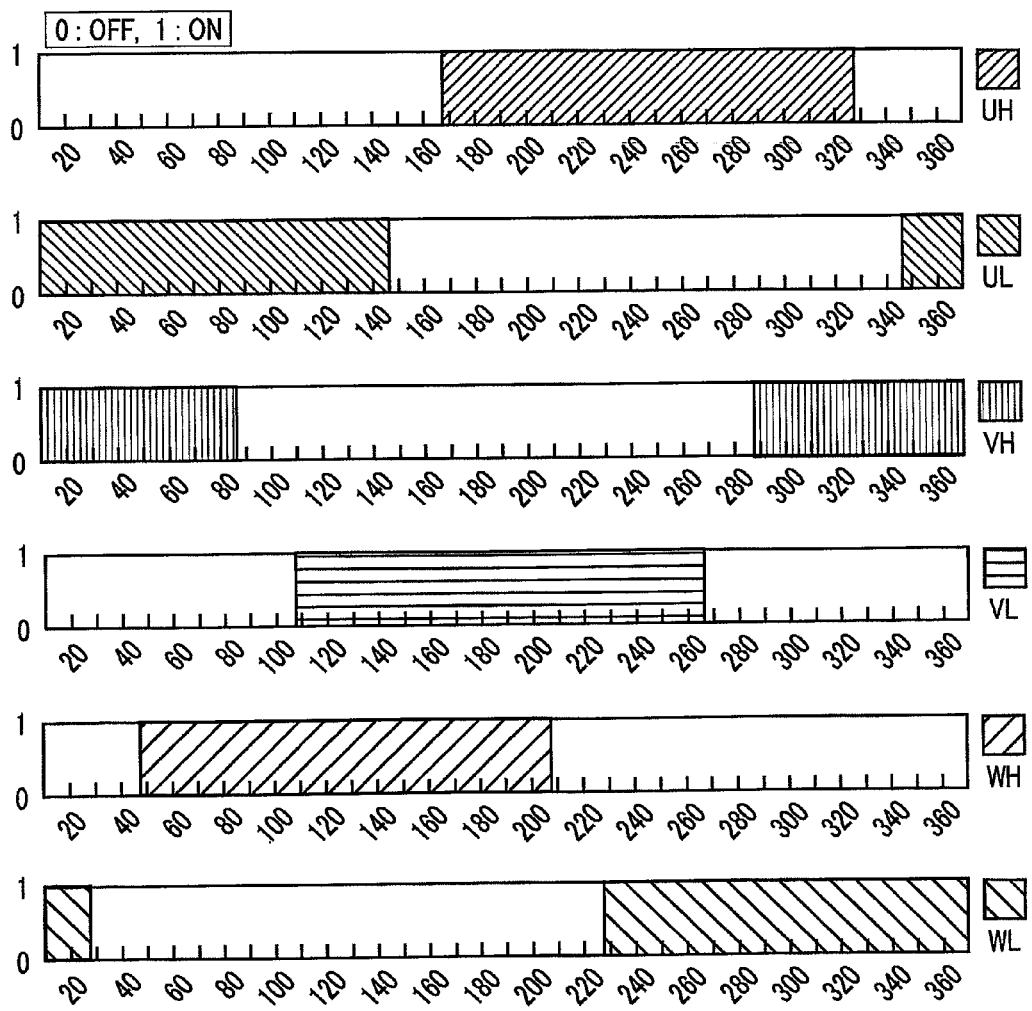
FIG. 5 is a chart of a voltage application pattern, according to Embodiment 1 of the present invention, in which the relationship among the three-phase terminal voltages, the voltages between three-phase terminals, and the rotor position is represented.
Figure 6A:
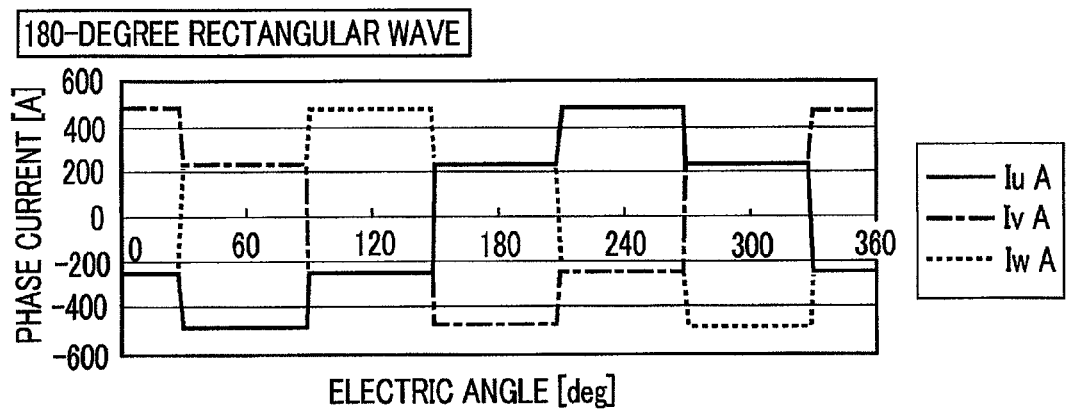
FIGS. 6A, 6B, and 6C are current pattern charts representing respective examples of current waveforms in the cases of a conventional 180-degree rectangular wave energization method, a conventional 120-degree rectangular wave energization method, and Embodiment 1.
Figure 6B:
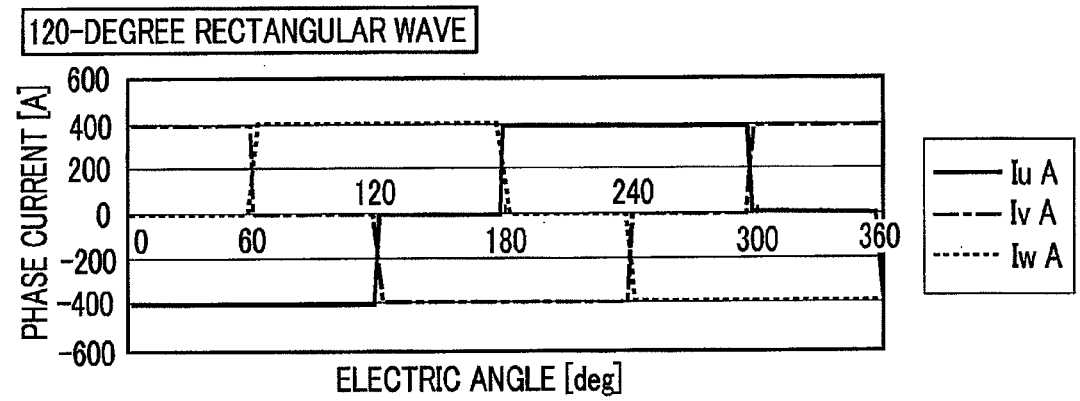
Figure 6C:
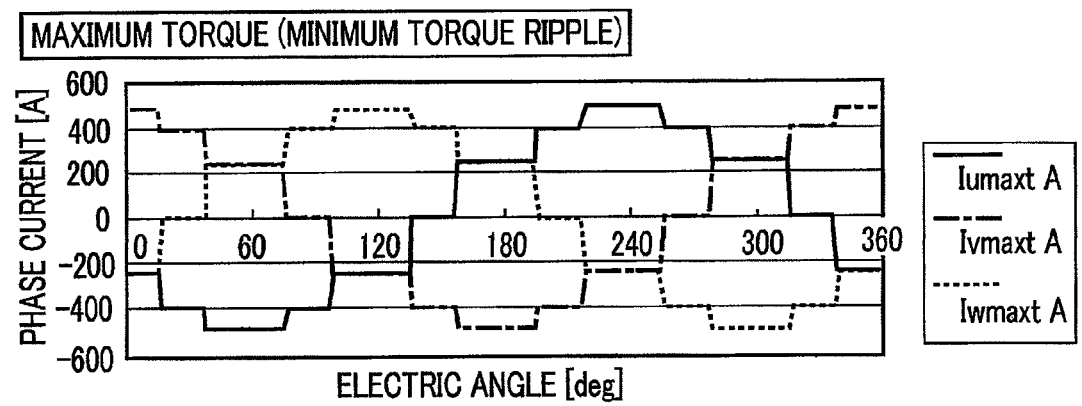

Next, the control operation according to Embodiment 1 will be explained. FIG. 3 is a chart representing respective examples of a rotor position, three-phase terminal voltages, and voltages between three-phase terminals in the case where energization is made in accordance with a 180-degree rectangular wave energization method, which is a conventional control method; FIG. 4 is a chart representing respective examples of a rotor position, three-phase terminal voltages, and voltages between three-phase terminals in the case where energization is made in accordance with a 120-degree rectangular wave energization method, which is also a conventional control method; FIG. 5 is a chart representing a voltage application pattern according to Embodiment 1 of the present invention. FIGS. 6A to 6C are graphs representing respective current patterns according to a conventional 180-degree rectangular wave energization method (FIG. 6A), a conventional 120-degree rectangular wave energization method (FIG. 6B), and Embodiment 1 (FIG. 6C). As is well known, torque T of a motor is given in the equation 1 below.

$$T = P_n \{ \Psi_a i_q + (L_d - L_q) i_d i_q \} \quad (1)$$

where T denotes torque; $P_n$, the number of pole pairs (the number of rotor poles/2); $\Psi_a$, magnetic flux; $i_d$, a d-axis current; $i_q$, a q-axis current; $L_d$, a d-axis inductance; and $L_q$ denotes a q-axis inductance.

As can be seen from the equation (1), a torque ripple is caused by fluctuations in the d-axial current and the q-axis current (harmonics due to slot pattern are neglected). Thus, by stabilizing the d-axial current and the q-axis current, the torque ripple can be reduced; however, the d-axial current and the q-axis current are stabilized only when the phase current is a sinusoidal wave. The phase current is required to be similar to a sinusoidal wave; however, in the conventional 180-degree rectangular wave energization method and the 120-degree rectangular wave energization method, the numbers of values that the phase currents can take are only 5 and 3, respectively, as represented in FIGS. 6A and 6B, and the shapes of the phase currents are step-shaped.

However, by combining the 180-degree rectangular wave energization method and the 120-degree rectangular wave energization method, the number of values that the phase current can take becomes 7, as represented in FIG. 6C, i.e., by combining the energizing patterns, 7-step step-shaped phase current can be obtained; thus, the phase current becomes similar to a sinusoidal wave, whereby the torque ripple can be reduced, and the average torque can be improved. The vehicle motor control apparatus according to Embodiment 1 of the present invention has been implemented in consideration of the viewpoints noted above.

As represented in FIG. 5, in Embodiment 1, the drive circuit 210 as a control means controls, in the following manner, the electric-power-conversion switching elements 220a to 220c (upper switch elements) and 221a to 221c (lower switch elements) for the three-phase inverter. That is to say, the drive circuit 210 controls the switch elements in such a way that there is combined a first ON state (i.e., the upper switch element group and the lower switch element group each energize the stator winding for one phase) in which, as performed in the 120-degree rectangular wave energization method, the upper switch element group and the lower switch element group energize respective terminals of the stator windings and a second ON state (i.e., either one of the upper switch element group and the lower switch element group energizes the stator winding for one phase and the other group energizes the stator windings for two phases) in which, as performed in the 180-degree rectangular wave energization method, one of the upper switch element group and the lower switch element group energizes one or two terminals of the stator windings and the other group energizes all other (two or one) terminals of the stator windings that are not energized; and the drive control is performed in such a way that the first and second ON states are alternately switched in one cycle period of an electric angle that changes as the rotor rotates.

Figure 7:
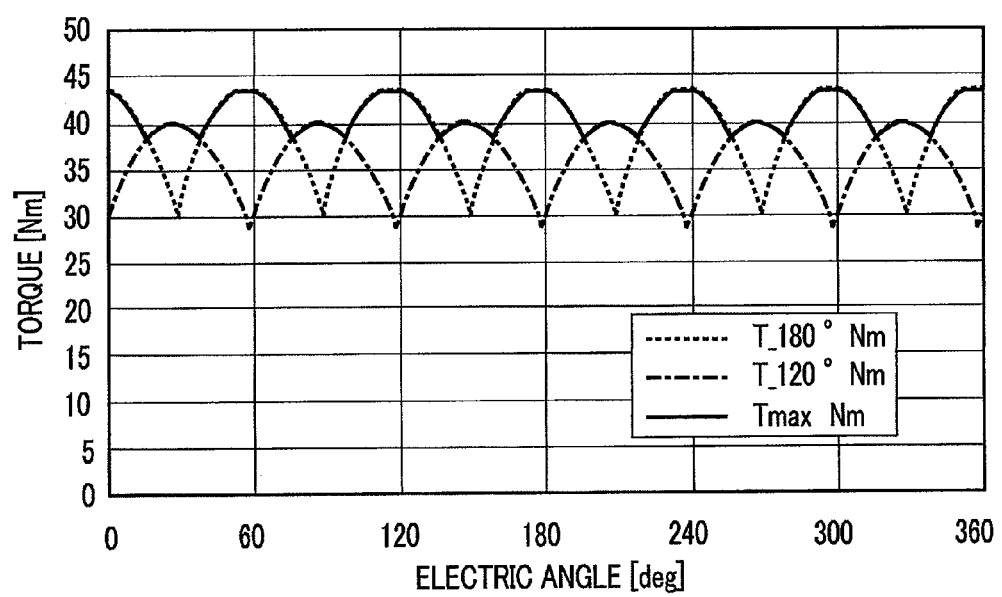
FIG. 7 is a graph representing respective examples of torque waveforms in the cases of a conventional 180-degree rectangular wave energization method, a conventional 120-degree rectangular wave energization method, and Embodiment 1.

FIG. 6C is a graph representing an example of a current waveform in Embodiment 1 when the control is performed as described above; FIG. 7 is a graph representing respective examples of torque waveforms when the control is performed according to the 180-degree rectangular wave energization method, the 120-degree rectangular wave energization method, and Embodiment 1. As is clear from the figures, according to Embodiment 1 of the present invention, the q-axis current out of the currents that flow in the stator windings for the respective phased becomes large, whereby the average torque can be enhanced. Moreover, because the current waveform becomes similar to a sinusoidal wave, fluctuation in the q-axis current decreases; therefore, the torque ripple can be reduced.

As described above, in the vehicle motor control apparatus, according to Embodiment 1 of the present invention, provided with an electric-power conversion unit in which a plurality of drive arms each provided with an upper switch element and a lower switch element that are connected in series with each other is connected between the positive and negative terminals of a DC power supply unit, and the respective intermediate connection points of the upper switch elements and the lower switch elements of the drive arms are connected with corresponding terminals for respective phases of the stator windings of a motor and a control means that on/off-controls the upper switch elements and the lower switch elements, thereby applying voltages to and energizing the stator windings of the motor so as to drive and control the motor, the control means causes a first ON state in which, through the upper switch element of one of the drive arms, one of the stator winding terminals is energized, and through the lower switch element of another drive arm, another stator winding terminal is energized and a second ON state in which, through the upper switch element group in the drive arms, one or two of the stator winding terminals are energized, and through the lower switch element group in the drive arms, all other stator winding terminals (two terminals or one terminal), which are not energized by the upper switch element group, are energized, and controls the electric-power conversion unit in such a way that the first and second ON states are alternately switched in one cycle period of an electric angle that changes as the rotor of the motor rotates.

In the vehicle motor control apparatus, according to Embodiment 1, configured as described above, the q-axis current, out of the currents that flow the stator windings of a motor, which has a large influence on the occurrence of torque, becomes large, whereby the average output torque of the motor can be enhanced. Moreover, because the current waveform becomes similar to a sinusoidal wave, fluctuation in the q-axis current decreases; therefore, the torque ripple can be reduced. As a result, it is made possible to raise the rotation speed of an engine up to a high speed when the engine is restarted, whereby the engine can rapidly and smoothly be restarted.

Still moreover, because the current waveform becomes similar to a sinusoidal wave and harmonic components decrease, electromagnetic exciting force that causes an electromagnetic noise sound and electromagnetic noise can be reduced; therefore, the noise sound of the motor, caused by electromagnetic exciting force, can be reduced.

In addition, in the foregoing explanation, a case has been described in which the stator winding connection is a Y-connection; however, even in the case of a Δ-connection, the control and the result to be obtained become the same as those in the case of the Y-connection, by converting the Δ-connection into a Y-connection.

Furthermore, as a variant example of Embodiment 1, the stator is configured with two three-phase windings the electric-angle phases of which are shifted from each other, so that the control can be performed by shifting the electric-angle phases of the two three-phase windings that have the same energization pattern, by a phase corresponding to the difference in the electric-angle phases between the two three-phase windings.

As described above, by superposing two three-phase windings, fluctuation in the q-axis current further decreases, whereby the torque ripple is reduced, so that the engine can rapidly and smoothly be restarted; additionally, because harmonic components decrease, the noise sound of the motor, caused by electromagnetic exciting force, can be reduced.

Still moreover, the electric-angle range applied in the first ON state is reduced as the rotation speed of the rotor of the motor increases, and the control at a high rotation speed is performed through the second ON state only, so that, when the motor rotates at a high rotation speed, the output torque can be enlarged by the control through only the second ON state in which the voltage utility is high, i.e., by the control in accordance with a 180-degree rectangular wave energization method.

Moreover, the first and second ON states are switched through the angle-position information on the rotor of a rotation sensor such as a resolver or a hall IC switch, so that the angle accuracy is improved, whereby the effect of Embodiment 1 can further be enhanced. In addition, in the case where a resolver is utilized as the rotation sensor, the absolute value of the angle position of the rotor is always recognized and there exists no delay; therefore, because the effect of correction and estimation can be reduced, the angle accuracy is enhanced. In the case of a hall IC switch, the rotation sensor can be formed inexpensively.

Still moreover, by changing the timing of switching the first and second ON states, based on the rotation speed of the motor and the DC voltage to be supplied, it is made possible to maximize the torque and minimize the torque ripple.

Various modifications and alterations of this invention will be apparent to those skilled in the art without departing from the scope and spirit of this invention, and it should be understood that this is not limited to the illustrative embodiments set forth herein.

What is claimed is:

1. A vehicle motor control apparatus comprising:
an electric-power conversion unit in which a plurality of drive arms each provided with an upper switch element and a lower switch element that are connected in series with each other is connected between the positive and negative terminals of a DC power supply unit, and the respective intermediate connection points of the upper switch elements and the lower switch elements of the drive arms are connected with corresponding terminals for respective phases of the stator windings of a motor; and a control means that on/off-controls the upper switch elements and the lower switch elements, thereby applying voltages to the stator windings of the motor and energizing the stator windings with a stator current so as to drive and control the motor, wherein the control means causes a first ON state in which, through the upper switch element group in the drive arms, one of the stator winding terminals is energized, and through the lower switch element group in the drive arms, another stator winding terminal is energized and a second ON state in which, through the upper switch element group in the drive arms, one or two of the stator winding terminals are energized, and through the lower switch element group in the drive arms, all other stator winding terminals, which are not energized by the upper switch element group, are energized, and controls the electric-power conversion unit in such a way that the first and second ON states are alternately switched in one cycle period of an electric angle that changes as the rotor of the motor rotates.

2. The vehicle motor control apparatus according to claim 1, wherein the stator windings include two three-phase windings the electric-angle phases of which are shifted from each other, and the control means performs the control by shifting the electric-angle phases of the two three-phase windings that have the same energization pattern, by a phase corresponding to the difference in an electric-angle phase between the two thee-phase windings.

3. The vehicle motor control apparatus according to claim 1, wherein the control means reduces an electric-angle range applied in the first ON state as the rotation speed of the rotor of the motor increases, so that the control at a high rotation speed is performed through the second ON state only.

4. The vehicle motor control apparatus according to claim 1, wherein the first and second ON states are switched based on rotor angular position information from a rotation sensor.

5. The vehicle motor control apparatus according to claim 4, wherein the rotation sensor is formed of a resolver or a hall IC switch.

6. The vehicle motor control apparatus according to claim 1, wherein the timing of switching the first and second ON states are changed, based on the rotation speed of the motor and a DC voltage to be supplied.

* * * * *